(12) United States Patent
Kanehira

(10) Patent No.: US 7,426,332 B2
(45) Date of Patent: Sep. 16, 2008

(54) VIDEO RECORDING APPARATUS

(75) Inventor: Takaharu Kanehira, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 792 days.

(21) Appl. No.: 10/958,645

(22) Filed: Oct. 6, 2004

(65) Prior Publication Data
US 2005/0111830 A1    May 26, 2005

(30) Foreign Application Priority Data
Oct. 8, 2003    (JP)    ............. P2003-348943

(51) Int. Cl.
*H04N 5/91* (2006.01)
(52) U.S. Cl. ......................... 386/83; 725/58
(58) Field of Classification Search .......... 386/46, 386/83, 125, 126; 725/25, 58, 59, 60, 61, 725/134, 135; 369/67, 30.36, 30.02; 380/258, 380/262
See application file for complete search history.

(56) References Cited

U.S. PATENT DOCUMENTS

| | | | | |
|---|---|---|---|---|
| 5,138,602 | A * | 8/1992 | Koike et al. | 369/67 |
| 6,243,353 | B1 * | 6/2001 | Nozaki et al. | 386/126 |
| 6,430,122 | B1 * | 8/2002 | Hamada et al. | 369/30.36 |
| 6,571,053 | B1 * | 5/2003 | Yasuzato | 386/83 |
| 7,181,128 | B1 * | 2/2007 | Wada et al. | 386/83 |
| 7,237,112 | B1 * | 6/2007 | Ishiguro et al. | 380/258 |
| 2003/0237086 | A1 * | 12/2003 | Boston et al. | 725/25 |

FOREIGN PATENT DOCUMENTS

| | | |
|---|---|---|
| JP | 2001-148825 | 5/2001 |
| JP | A-2001-148825 | 5/2001 |
| JP | 2002-77799 | 3/2002 |
| JP | 2002-305706 | 10/2002 |
| JP | A-2002-305706 | 10/2002 |
| JP | 2002-335476 | 11/2002 |

* cited by examiner

*Primary Examiner*—John W. Miller
*Assistant Examiner*—Christopher Onuaku
(74) *Attorney, Agent, or Firm*—Morgan, Lewis & Bockius LLP

(57) ABSTRACT

A video recording apparatus includes: a recording and reproducing unit that records and reproduces a program onto and from a recording medium; a program reserving unit that provides a reservation of the program for programmed recording of the program in one of a plurality of modes including "overwrite after reproduction" mode; and a control unit that controls the recording and reproducing unit, wherein the control unit controls, in accordance with the reservation made by the program reserving unit, the recording and reproducing unit to record the program in either of a free area and a recorded area that is permitted to overwrite of the recording medium, wherein the control unit controls the recording and reproducing unit to prohibit overwriting a recorded program in a case where the recorded program is recorded in the "overwrite after reproduction" mode and a reproduction of the recorded program being unfinished.

9 Claims, 8 Drawing Sheets

FIG. 2

| Program | Month/Date | Week Day | Starting Time | Ending Time | Channel | Mode | Recording Method |
|---|---|---|---|---|---|---|---|
| 1 | 06/02 | Monday | 08:00 | 08:30 | 8 | SP | Normal Recording |
| 2 | Every Week | Monday | 10:00 | 10:30 | 1 | LP | Overwrite After Reproduction |
| 3 | Every Week | Wednesday | 20:00 | 21:00 | 4 | LP | Overwrite Recording |
| 4 | Everyday | | 05:30 | 05:45 | 3 | LP | Overwrite After Reproduction |
| | | | New Reservation | | | | |

FIG. 3

| Program | Month/Date | Week Day | Starting Time | Ending Time | Channel | Mode | Recording Method | Reproduction State |
|---|---|---|---|---|---|---|---|---|
| 1 | 06/02 | Monday | 08:00 | 08:30 | 8 | SP | Normal Recording | Reproduction Unfinished |
| 2 | Every Week (06/16) | Monday | 10:00 | 10:30 | 1 | LP | Overwrite After Reproduction | Reproduction Finished |
| 2 | Every Week (06/23) | Monday | 10:00 | 10:30 | 1 | LP | Overwrite After Reproduction | Reproduction Unfinished |
| 3 | Every Week (06/11) | Wednesday | 20:00 | 21:00 | 4 | LP | Overwrite Recording | Reproduction Finished |
| 3 | Every Week (06/25) | Wednesday | 20:00 | 21:00 | 4 | LP | Overwrite Recording | Reproduction Unfinished |
| 4 | Every Day (06/23) | Monday | 05:30 | 05:45 | 3 | LP | Overwrite After Reproduction | Reproduction Finished |
| 4 | Every Day (06/24) | Tuesday | 05:30 | 05:45 | 3 | LP | Overwrite After Reproduction | Reproduction Unfinished |
| 4 | Every Day (06/25) | Wednesday | 05:30 | 05:45 | 3 | LP | Overwrite After Reproduction | Reproduction Unfinished |

This program has been reproduced. Do you agree with recording of a new data via an overwriting against this program? — 33

Yes  No

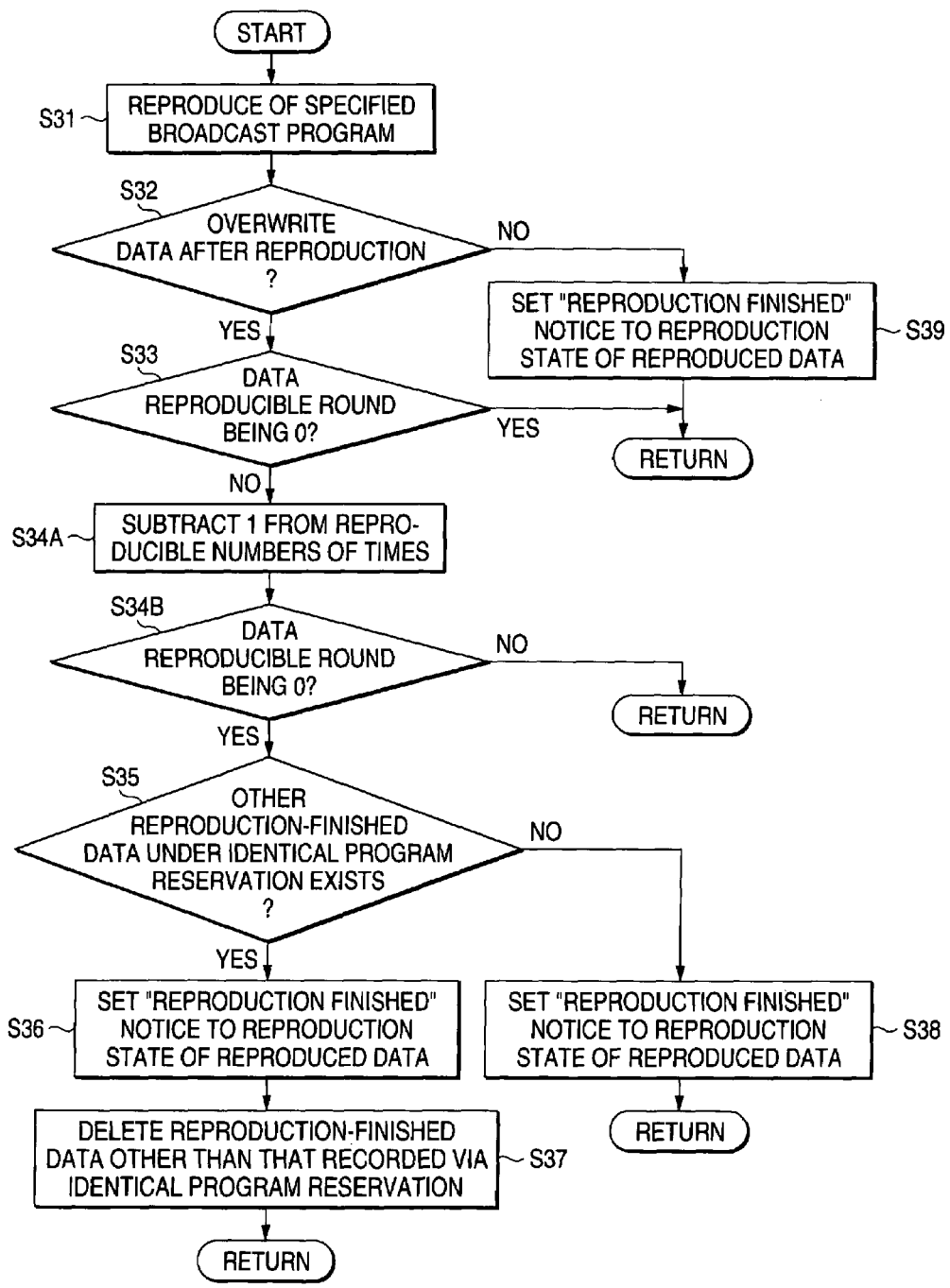

VIDEO RECORDING APPARATUS

BACKGROUND OF THE INVENTION

1. Field of the Invention

The present invention relates to a video recording apparatus incorporating a programmed recording function (timer recording function) for recording a television broadcast program, and a method therefor.

2. Description of the Related Art

Inasmuch as the recording capacity of a recording medium used for any conventional videotape recorders or DVD (Digital Versatile Disc) recorders still remains insufficient, viewers are inconveniently obliged to frequently replace the recording medium or delete the recorded data or data files. To solve this problem, recently, a modern data video recording apparatus has become commercially available, which includes with a hard disk drive capable of recording television broadcast programs corresponding to approximately 100 hours of recording duration. Nevertheless, even if the recording capacity of any of the available recording media has been expanded, unless recorded data is adequately deleted, the available free area soon disappears in due course of time.

In JP-A-2002-305706 (See section [0025] to section [0035]), there is disclosed a video recording apparatus that records video data in a hard disk drive. The recorded files are classified into an unerasable video data file, a reproduction unfinished video data file, and a reproduction finished video data file. In the case where no free area is available for recording new video data on a hard disk drive, the new video data is recorded on the reproduction finished video data file via an overwriting process. In the case where no data file is finished with the reproduction, a confirming screen message appears on a display, and then, only when a viewer approves overwriting, the display designates that the new video data will be recorded in the reproduction pending data file via an overwriting process. The unerasable mode can be set via manual operation of a viewer when reproducing a video data file or at any optional time after completing a video recording process.

In JP-A-2001-148825 (See section [0014] to section [0028]), there is disclosed a videotape recorder having a hard disk drive. The video tape recorder disclosed in JP-A-2001-148825 classifies a video data file recorded on the hard disk drive into four data files including an unerasable reproduction unfinished video data file, a erasable reproduction unfinished video data file, an unerasable reproduction finished video data file, and an erasable reproduction finished video data file. In the case where no free area is available for recording new video data on a hard disk drive, the new video data is recorded in the erasable reproduction finished video data file via an overwriting process. In the case where no erasable reproduction finished data file exists, the above art enables another data file (with the least probability to incur an obstacle by the overwriting) to be recorded on a videotape, and then, further enables new data to be recorded in the above data file via an overwriting process.

SUMMARY OF THE INVENTION

Nevertheless, in the related art cited in the JP-A-2002-305706, in order to prevent any of the reproduction finished data files from being overwritten for recording new data, it is essential for individual viewers to implement operation for setting the unerasable mode per data file, and yet, this operation involves complex and troublesome processes. This problem is particularly noticeable in the course of performing periodic recording processes everyday or every week, for example. Even when using such a reproduction finished data file free from incurring any critical problem from the overwriting, this data file remains on a hard disk drive until being subject to a process for recording new data via an overwriting process. For this reason, when displaying a list of programs of recorded data files before reproducing the recorded broadcast programs, for example, a number of the reproduction finished data files are displayed, thus raising much difficulty on the part of a viewer to locate an objective data file desired for reproduction as a problem to solve. Further, in order that the list of the programs of recorded video data files can readily be seen, the viewer is obliged to undergo complex processes in the course of individually deleting unwanted data files finished with a reproduction process. This problem is particularly noticeable in the case of data files subject to periodic recording processes.

The other related art cited in JP-A-2001-148825 also encounters a problem similar to the one of the related art cited in JP-A-2002-305706. It is so arranged that any data file other than the erasable reproduction finished data files can be copied in a videotape when being subject to a recording process via an overwriting step. However, in the case of performing a recording via reservation of a predetermined program, it is not always possible for a viewer to remain in front of a video recorder so as to load a blank videotape therein. Further, it is not always likely that free area still exists on a previously loaded videotape. It should be understood that the above patent documents respectively describe a means for handling such a contingency when the loaded recording medium is found to be devoid of a free area before commencing a video data recording process because the above-cited art fails to describe any effective means for preventing a free area from being decreased.

The present invention aims at fully solving the above problems. One of objects of the present invention is to provide a video recording apparatus and a recording and reproducing method using the video recording apparatus, which are respectively capable of securely preventing a free area of a recording medium from being decreased without complex procedures and further capable of avoiding the potential fear of missing the previously recorded data.

According to a first aspect of the invention, there is provided a recording and reproducing apparatus including: a program reserving unit for reserving recording of a broadcast program; a recording and reproducing unit, which enables a periodically broadcast periodic broadcast program reserved via said program reserving unit to be recorded on a recording medium so as to enable said periodic broadcast program recorded on said recording medium to be reproduced; a first control unit, which controls recording operation of said recording and reproducing unit; and a second control unit, which controls reproducing operation of said recording and reproducing unit; wherein when causing said program reserving unit to set a recording method so as to "overwrite after reproduction" in the course of recording a reserved periodic broadcast program onto a recording medium, in the case where data previously recorded earlier than said periodic broadcast program finished with a reproduction process still remains in said recording medium, said first control unit causes data of the presently available periodic broadcast program to be recorded via overwriting onto an area previously recorded with said data, and then, said first control unit sets a "reproduction unfinished" domain in the controlling area of said recorded data so as to designate the actual reproduction state; whereas in the case where said recorded data finished with a reproduction process does not exist on said recording medium, said first control unit enables data of the presently available periodic broadcast program to be recorded in a vacant area of said recording medium, and then, sets an "overwrite after reproduction" mode as per said recording method and further sets a "reproduction unfinished" mode so as to designate the actual reproduction state in the controlling area of said recorded data, wherein when reproducing data recorded from a periodic broadcast program so as to "overwrite after reproduction" in the controlling area, said second control unit displays a screen message for confirming whether an act of overwriting against said recorded data is approvable or not, and simultaneously, when a viewer approves the act of overwriting, in the case where recorded data other than the corresponding periodic broadcast program identical to the recorded data finished with a reproduction process still exists on a recording medium, said second control unit deletes either the reproduction finished recorded data or said other recorded data from said recording medium wherein when said other data has been deleted, a "reproduction finished" mode is set so as to designate the reproduction state of the above reproduction finished recorded data; wherein, if the viewer approves the act of overwriting, if the above-referred other recorded data finished with a reproduction process dose not exist on said recording medium, said second control unit sets a "reproduction finished" notice so as to designate the actual reproduction state of the reproduction finished recorded data, wherein said first control unit prohibits any operation that may cause data of any program other than the data of said periodic broadcast program to be recorded via an overwriting against a data recorded area accommodating data of said previously recorded periodic broadcast program in the state specified by its recording method to "overwrite after reproduction" in the controlling area and further in the state in which the actual reproduction state of said periodic broadcast program has been designated as the "reproduction finished" state.

According to a second aspect of the invention, there is provided a recording and reproducing method available for a recording and reproducing apparatus including a program reserving unit for reserving the recording of a broadcast program and a recording and reproducing unit for recording a periodically broadcast program reserved by said program reserving unit on a recording medium and also for reproducing said periodic broadcast program recorded on said recording medium, said recording and reproducing method including; causing said program reserving unit to set said program recording method by specifying so as to "overwrite after reproduction;" determining whether data recorded earlier than the presently available periodic broadcast program for designating an actual reproduction state of said data which has already finished a reproduction process still exists on said recording medium or not at the time of causing said recording and reproducing unit to record said periodic broadcast program complete with setting of its recording method specifying so as to "overwrite after reproduction" onto said recording medium; setting a "reproduction unfinished" notice for designating the reproduction state in a controlling area for controlling data of the presently available periodic broadcast program recorded via an overwriting process in an area provided for recording said data in the case where said recorded data finished with a reproduction process still exists on said recording medium; setting an "overwrite after reproduction" format as a method for recording data of the presently available periodic broadcast program in a vacant area of said recording medium; wherein said "overwrite after reproduction" format is set within the controlling area of said recorded data, and a "reproduction unfinished" notice is set so as to designate the reproduction state in the case where the recorded data finished with a reproduction process does not exist on said recording medium; determining whether recorded data finished with a reproduction process for designating the reproduction state exists in said recording medium or not, wherein when causing said recording and reproducing unit to reproduce recorded data of a periodic broadcast program pertaining to the reservation of said program as per its recording method specified so as to "overwrite data after a reproduction," wherein after reproducing said recorded data, a screen message is displayed so as to confirm whether overwriting against said recorded data is approvable or not, and then, if the viewer approves an act of overwriting, other recorded data of a periodic broadcast program identical to said recorded data finished with a reproduction process is discerned whether or not said recorded data finished with a reproduction process in the manner of designating its reproduction state still exists on said recording medium; setting a "reproduction finished" notice so as to designate the reproduction state of recorded data finished with a reproduction process; wherein, if it is determined that the above-referred other data still exists on said recording medium, either said reproduction finished recorded data or said other recorded data is deleted from said recording medium, whereas when said other data has been deleted, the "reproduction finished" notice is generated; setting a "reproduction finished" notice for designating the reproduction state of said recorded data finished with a reproduction process when absence of said other data from said recording medium has been determined; and prohibiting to record any data corresponding to any program other than the corresponding periodic broadcast program in a specific area predetermined for the recording of data of a predetermined periodic broadcast program pertaining to the reserved program entered via the recording method specifying so as to "overwrite after reproduction" in the controlling area and a notice for notifying of a "reproduction finished" mode to be set.

According to a third aspect of the invention, there is provided a recording and reproducing apparatus including: a recording and reproducing unit for recording and reproducing a program onto and from a recording medium; a program reserving unit for reserving recording of a program; and a control unit for controlling a function of said recording and reproducing unit, wherein when causing said recording and reproducing unit to record a reserved periodic broadcast program onto said recording medium as per the instructions of said program reserving unit to implement its recording method so as to "overwrite after reproduction," said control unit records data of said periodic broadcast program in a vacant area of said recording medium or in a recording area (of said recording medium) free from prohibition of overwriting; wherein, when causing said recording and reproducing unit to reproduce recorded data of said periodic broadcast program pertaining to said program reservation as per its recording method specifying so as to "overwrite after reproduction," said control unit deletes said recorded data finished with said reproduction process from said recording medium so that the unit number of said data recorded from said periodic broadcast program finished with a reproduction process will become less than the predetermined unit number.

According to a fourth aspect of the invention, there is provided a recording and reproducing apparatus including: a recording and reproducing unit for recording and reproducing program data onto and from a recording medium; a recording instructing unit for instructing said recording and reproducing unit to perform a process for recording program data; and a control unit for controlling the function of said recording and reproducing unit and said recording instructing unit, wherein said recording instructing unit is capable of arranging the method of recording program data that should be recorded on a recording medium so as to "overwrite after reproduction," and also capable of setting the number of reproducible times for the reproducible data recorded from a program to be subject to "overwrite after reproduction," wherein when the data recorded from a program to be subject to the instructions of said recording method so as to overwrite said data after termination of a reproduction process has been reproduced by a specific number of reproducible times, said control unit handles this data as data finished with a reproduction process, wherein when the corresponding recorded data is not yet finished with a reproduction process, said control unit prohibits an act of overwriting any data against the corresponding recorded data, whereas when the corresponding recorded data is finished with a reproduction process, said control unit approves the act of overwriting any data against the corresponding recorded data.

According to a fifth aspect of the invention, there is provided a video recording apparatus including: a recording and reproducing unit that records and reproduces a program onto and from a recording medium; a program reserving unit that provides a reservation of the program for programmed recording of the program in one of a plurality of modes including "overwrite after reproduction" mode; and a control unit that controls the recording and reproducing unit, wherein the control unit controls, in accordance with the reservation made by the program reserving unit, the recording and reproducing unit to record the program in either of a free area and a recorded area that is permitted to overwrite of the recording medium, wherein the control unit controls the recording and reproducing unit to prohibit overwriting a recorded program in a case where the recorded program is recorded in the "overwrite after reproduction" mode and a reproduction of the recorded program being unfinished.

BRIEF DESCRIPTION OF THE DRAWINGS

The above objects and advantages of the present invention will become more apparent by describing a preferred exemplary embodiment thereof in detail with reference to the accompanying drawings, wherein:

FIG. 2 is a chart for exemplifying the configuration of a program reservation list;

FIG. 3 is a chart for exemplifying the configuration of a program recording list;

FIG. 7 is an example of a screen message for confirming the will of a viewer so as to approve or disapprove an act of overwriting; and FIG. 8 is a flowchart for exemplifying serial operations performed for another embodiment according to the present invention.

DETAILED DESCRIPTION OF THE PREFERRED EMBODIMENTS

Referring now to the accompanying drawings, a description will be given in detail of preferred embodiments of the invention.

Figure 1:
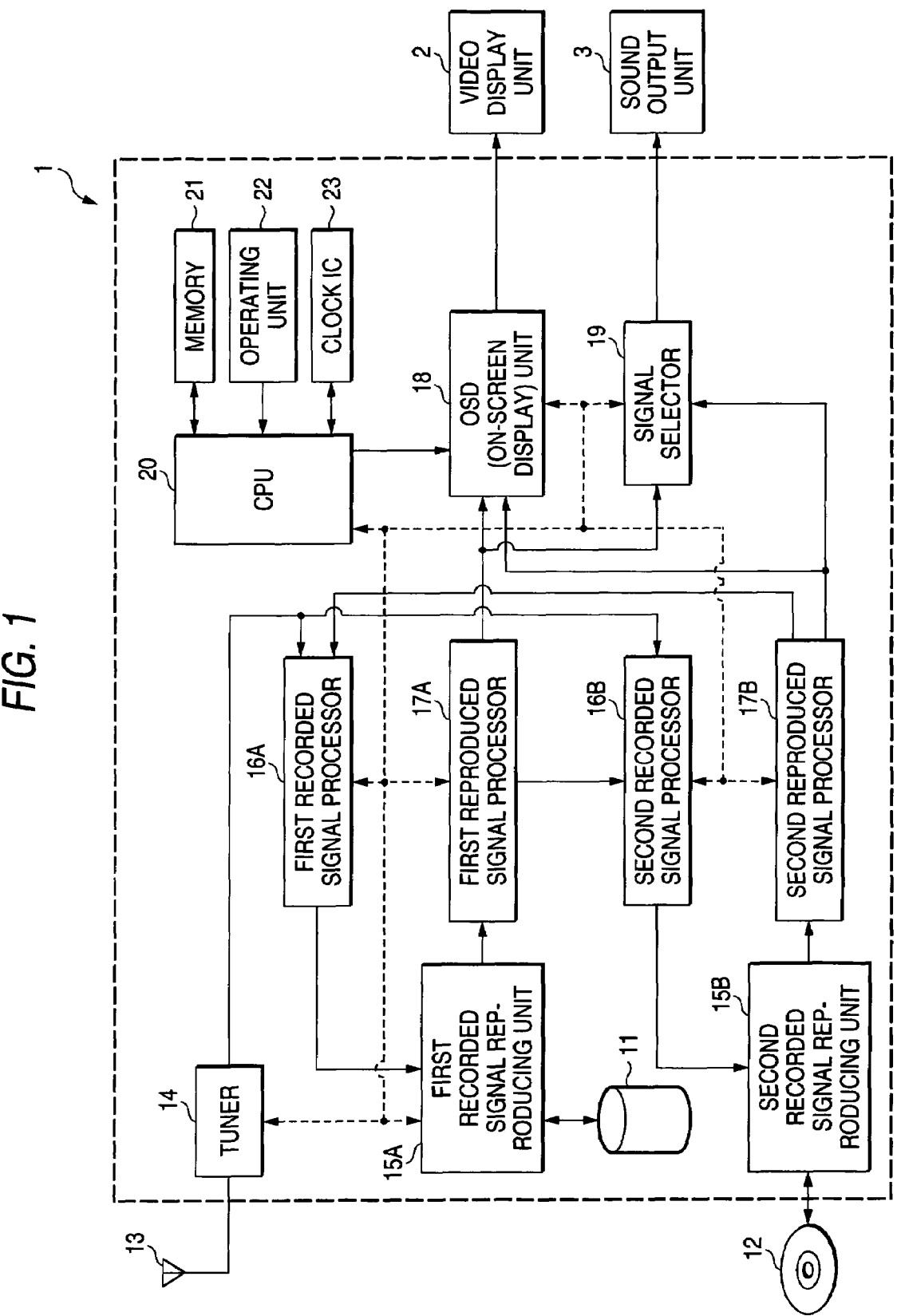
FIG. 1 is a simplified schematic block diagram designating a video recording apparatus according to an embodiment of the present invention.

FIG. 1 is a simplified block diagram of a video recording apparatus 1 according to one embodiment of the present invention. The video recording apparatus 1 is mounted with a hard disk drive 11, which serves as a randomly accessible recording medium. The hard disk drive 11 records and reproduces video and audible data transmitted via a broadcast program. The inventive video recording apparatus 1 also reproduces audible and visual data recorded in any of the replaceable recording media such as a DVD or a CD, typically, recorded on a removable disc 12, for example. If the removable disc 12 is of a write-enable recording medium such as a DVD-R, a DVD-RW, or a DVD-RAM, data of a broadcast program can also be recorded therein.

A broadcast signal received by an antenna 13 is selectively tuned in by a tuner 14, and then, the tuned-in broadcast signal is routed to a first and second recording signal processors 16A and 16B. In the first recording signal processor 16A, the input signal is treated with an A/D (analog to digital) conversion, for example, the input signal is compressed and encoded as per the MPEG-2 (Motion Picture Expert Group) format. The encoded signal is recorded onto the hard disk drive 11 at a first recording and reproducing unit 15A. The first recording and reproducing unit 15A includes a recording and reproducing head for enabling the encoded data to be recorded on or reproduced from the hard disk drive 11, a seeking unit for causing the recording and reproducing head to be shifted in the radial direction of the hard disk drive 11, and a revolving drive mechanism for enabling the hard disk drive 11 to be rotated. Data output from the hard disk drive 11 is reproduced by the first recording and reproducing unit 15A, and then decoded into video and audio signals by a first reproduced signal processor 17A. The decoded video and audio signals are then respectively subject to the D/A conversion. Next, the D/A converted video signal is transmitted to an OSD (On Screen Display) processor 18, whereas the D/A converted audio signal is transmitted to a signal selector 19.

In the second recording signal processor 16B, the input signal is also treated with the A/D conversion, for example, the input signal is compressed and encoded as per the MPEG-2 format. The encoded signal is then recorded into a removable disc 12 at a second recording and reproducing unit 15B. The second recording and reproducing unit 15B includes a tray for loading the removable disc 12 thereon so as to carry it inside and outside of the unit 15B, an optical pickup for enabling data to be recorded onto or reproduced from the removable disc 12, a shifting mechanism for shifting the optical pickup in the radial direction of the removable disc 12, and a revolving drive mechanism for causing the removable disc 12 to be rotated. The encoded data recorded on the removable disc 12 is reproduced by the second recording and reproducing unit 15B, and then decoded into video and audio signals at a second reproduced signal processor 17B. Then, the decoded video and audio signals are respectively treated with the D/A conversion. Finally, the D/A converted video signal is transmitted to the OSD processor 18, whereas the D/A converted audio signal is transmitted to the signal selector 19.

The CPU 20 selects video signals transmitted from either of the first and second reproduced signal processors 17A and 17B. Likewise, the OSD processor 18 superposes various signals output from the CPU 20 for implementing the on-screen display (hereinafter referred to as ODS). Signals output from the OSD processor 18 are transmitted to a video display unit 2 consisting of a display screen of a TV monitor, for example. Note that the video recording apparatus 1 offered by the present invention incorporates the function of the OSD. OSD data is stored in a memory 21, which is read by the CPU 20 as required, partially processed depending on the case. The processed OSD data is superposed with data reproduced from the hard disk drive 11 or the removable disc 12 in the OSD processor 18.

The signal selector 19 selects audio signals transmitted from either of the first and second reproduced signal processors 17A and 17B via the CPU 20. Signal output from the signal selector 19 is transmitted to a sound output unit 3 consisting of a vocal output unit of an audio set or a TV receiving set, for example.

Signal output from the first reproduced signal processor 17A is transmitted to the second recording signal processor 16B, and signal output from the second reproduced signal processor 17B is transmitted to the first recording signal processor 16A, and thus, it is possible to cause data of the hard disk drive 11 to be copied onto the removable disc 12 or vice versa. Further, inasmuch as the inventive video recording apparatus 1 incorporates the above-referred first and second recording and reproducing units 15A and 15B, first and second recording signal processors 16A and 16B, and first and second reproduced signal processors 17A and 17B, in the course of viewing a movie recorded on the removable disc 12, it is possible to record a reserved broadcast program onto the hard disk drive 11. On the other hand, in the course of viewing a broadcast program recorded on the hard disk drive 11, it is also possible to record a reserved broadcast program onto the removable disc 12.

The following description refers to an example of a process for programmably recording a reserved broadcast program onto the hard disk drive 11. The term "program reservation" refers to the act of specifying the time and date of commencing a broadcast program and a channel etc., required for programmably recording a broadcast program on the hard disk drive 11. The term "programmed recording" refers to the act of recording a broadcast program onto the hard disk drive 11 at the time for commencing the recording operation has been reached according to the contents of the reserved program.

The CPU 20 is linked with a memory 21, an operating unit 22, and a clock IC 23. The memory 21 stores a program for controlling operations of the video recording apparatus 1, above-referred OSD data, and various controlling data. Further, the memory 21 is used as an arithmetic work area of the CPU 20. In the following description, it is assumed that the memory 21 is a type of a non-volatile component.

The clock IC 23 stores the presently existing date, month, year, and the actual time (hereinafter these are collectively referred as "data and time"). These data are read out by the CPU 20. It is also practicable to realize the function identical to that of the clock IC 23 by applying a quartz oscillator and a timer.

The operating unit 22 includes a remote controller (not shown) comprising a plurality of keys and number keys disposed on the front panel (not shown) of the video recording apparatus 1. More specifically, the operating unit 22 includes the following: a reproduction key for actuating a reproducing operation of the hard disk drive 11 or the removable disc 12, a suspension key for suspending the reproducing operation, numeric keys for entering numerals 0 to 9, a menu key for displaying the menu screen, a cursor key for choosing individual operating items shown on the menu screen, and a decision key for executing the selected operating items. When any of these keys is depressed, the selected signal is transmitted to the CPU 20 so as to enable a processing operation corresponding to the kind of the depressed key to be executed accordingly.

FIG. 2 shows a chart for exemplifying a reserved program list 31. By operating a predetermined key of the operating unit 22 via a predetermined procedure, the reserved program list 31 is displayed on a screen of a video display unit 2. In this chart, four of the broadcast programs including programs 1 to 4 have already been reserved. Program reservation is effected by executing serial operations as in the following. When the reserved program list 31 is displayed, the viewer selects "new reservation" by operating the cursor and then depresses the decision key to cause a program reservation setting screen (not shown) to be displayed on the screen. In the presence of this screen on display, the viewer sets up the program commencing time and the desired channel as was previously set for the above programs 1 to 4 by operating the cursor key and numeric keys. It is also possible to store the program reservation list 31 in the memory 21 as data. Alternatively, it is also possible to store the program reservation list 31 on the hard disk drive 11 as a data file and temporarily store this list in the memory 21 as required. Those keys set to the operating unit 22 used for reserving programs, a program for realizing serial processes for reserving programs stored in the memory 21, and the CPU 20, jointly serves as the above-referred program reserving unit of the present invention.

Next, contents of the program reservation list 31 are described below. Program 1 designates that a broadcast program on channel 8 during a period from 8:00 am to 8:30 am on June 2nd, Monday, has been reserved for recording via the "normal recording" format based on the SP (standard play) mode. The "normal recording" format prohibits overwriting other data against the recorded areas irrespective of whether the recorded data has been reproduced or not.

Program 2 designates that a broadcast program being broadcast on channel 1 during a period from 10:00 am to 10:30 am, every Monday, has been reserved for recording the program based on the recording method specifying so as to "overwrite after reproduction" based on the LP (long-time play) mode.

The "overwrite after reproduction" format constitutes the essential recording method proposed by the present invention. Summary of this essential recording method is described below. First, when recording a reserved program, contents data of the broadcast program are recorded in a free area of the hard disk drive 11. When recording the secondly reserved broadcast program, in a case where the data initially recorded via the first reservation has already been reproduced and still remains on the hard disk drive 11 without being subject to a data-deleting process, the secondly recorded data is overwritten in the area containing the initially recorded data. When recording the secondly reserved program, in a case where the data recorded via the initial reservation has not yet been reproduced, the secondly reserved program data is recorded in a free area of the hard disk drive 11. Also, when the secondly reserved and recorded program data is reproduced subsequently to the preceding data reproduction, either of the initially and secondly reserved and recorded data is automatically deleted from the hard disk drive 11. In other words, the area thus far recorded with the initially reserved data and the secondly reserved data is released to be blank, thereby generating a free area.

The above contents are further described below via generalization. Concretely, when reserving the N-th data for a programmed recording, In the case where any reproduction finished data previously reserved via an identical program on the hard disk drive 11, the N-th data is overwritten in the area recorded with the reproduction finished data. On the other hand, in the case where no reproduction finished data previously reserved via an identical program exists on the hard disk drive 11, the N-th data will be recorded in a free area of the hard disk drive 11. Also, when data recorded via a previously reserved program is reproduced, if other data finished with a reproduction previously reserved for recording via an identical program exists on the hard disk drive 11, then, either of these two data is automatically deleted from the hard disk drive 11. Further, recording via overwriting of any data other than that was recorded via reservation of an identical program is prohibited from the area recorded with a reproduction finished data based on the essential recording method specifying so as to "overwrite after reproduction." The process to implement the "overwrite after reproduction" is executed by applying programs stored in the CPU 20 and the memory 21. Operations of these programs will be described later on.

As described above, inasmuch as any excessive data is automatically deleted from the hard disk drive 11 so that the number of the reproduction finished data will not become more than one, even when recording is periodically reserved, insofar as the recorded data is adequately reproduced, the free area of the hard disk drive 11 can be prevented from being decreased. Further, inasmuch as the deletion of the recorded data is executed after finishing reproduction of a relevant data, any excessive data is not displayed in another program recording list 32 shown in FIG. 3 to be described later on. Accordingly, the viewer is enabled to readily locate any broadcast program desired for reproduction from the program recording list 32. Further, inasmuch as any excessive data is automatically deleted from the hard disk drive 11, unwanted processes otherwise required for deleting individual data files can be eliminated.

The above description has referred to the case of arranging that the number of the reproduction finished data will not exceed one unit. However, it is also possible to secure an identical effect even when arranging that the reproduction finished data will become less than a predetermined unit number. For example, this is because, if the broadcast duration of a program periodically reserved for recording is as short as 10 minutes, even when there is merely a unit or 3 units of the reproduction finished recorded data, there is no significant difference in terms of the substantial effect from the aspect of preventing the free area of the hard disk drive 11 capable of containing broadcast program data corresponding to a 100 hours duration from being decreased. The broadcast program data is recorded as a file on the hard disk drive 11, and accordingly, the term "data" and the other term "file" are identical in terms of meaning of substantial effect. For example, an act of "deleting data" described above has the meaning "deleting a file recorded with the corresponding data" as data being identical in meaning.

Program 3 designates that a broadcast program on channel 4 in a period from 20:00 pm to 21:00 pm has been reserved for recording based on the LP mode as per the recording method specifying so as to "overwrite recording." The "overwrite recording" method allows an overwriting of any data in an area recorded with a previous data not yet finished with a reproduction process. However, if a free area still remains on the hard disk drive 11, new data is recorded in the free area, and thus, the available recording area will not be overwritten with any data as long as any free area exists therein.

Program 4 designates that a broadcast program on channel 3 has been reserved for recording everyday during period from 5:30 am to 5:45 am based on the LP mode via the recording method specifying so as to "overwrite after reproduction."

FIG. 3 exemplifies another program recording list 32, which is displayed on a display screen of the video display unit 2 via the viewer's manual operation to operate predetermined keys of the operating unit 2 as per the predetermined processes. FIG. 3 exemplifies contents of broadcast programs recorded via the reservation shown in the preceding program reservation list 31 of FIG. 2. The difference from the program recording list 31 is described below. In the preceding program recording list 31, programs 2 to 4 respectively specify "every week" or "everyday." And in order to clarify the date and month in which the reserved program data had been recorded, the program recording list 31 is added with information for designating concrete dates in terms of "06/16" in the column of "month/date," for example. A column "reproduction state" is further added so as to enable viewers to discern whether the broadcast program reserved for recording has already been reproduced, or not.

The program recording list 32 may be stored in the memory 21 as a unit of data, or may be recorded on the hard disk drive 11 as a file unit, and may also be stored in the memory 21 temporarily as required. Alternatively, it is also allowable to record information shown in the program recording list 32 as part of file controlling information, i.e., as part of directory information, in the course of recording data of individual broadcast programs on the hard disk drive 11 as a file. It is also possible to read information for controlling individual files as required and then temporarily store the read-out information in the memory 21. In any case, information shown in the program recording list 32 is recorded and stored in the controlling area.

Next, the program 2 classifying the applicable recording method by way of specifying so as to "overwrite after reproduction" is described below. It is assumed that a program shown in the program recording list 31 had been reserved on June 1st, and then, the program recording list 32 was displayed on June 26th. The broadcast program shown in the program 2 was recorded on June 2nd, 9th, 16th, and 23rd via reservation. Of these, the program data broadcast on June 2nd and 9th were respectively deleted from the hard disk drive 11 after being reproduced. In terms of the reproduction finished recorded data, only the data recorded on the 16th remained on the hard disk drive 11, whereas the program data recorded on the 23rd has not yet been reproduced.

Although not directly concerned with the present invention, an example for practically using the program recording list 32 is briefly described below. In this example, while the program recording list 32 remains displayed, by operating a cursor key, the viewer chooses any of the broadcast programs and then depresses a decision key. In response, a screen (not shown) is displayed so as to enable the viewer to choose a reproduction process, a deleting process and the like. For example, if the viewer depresses the decision key after choosing the reproduction mode via the cursor key, it actuates reproduction of the selected broadcast program. Conversely, if the viewer depresses the decision key after choosing the deleting mode via the cursor key, the recorded data (file) of the selected broadcast program is deleted from the hard disk drive 11.

Figure 4:
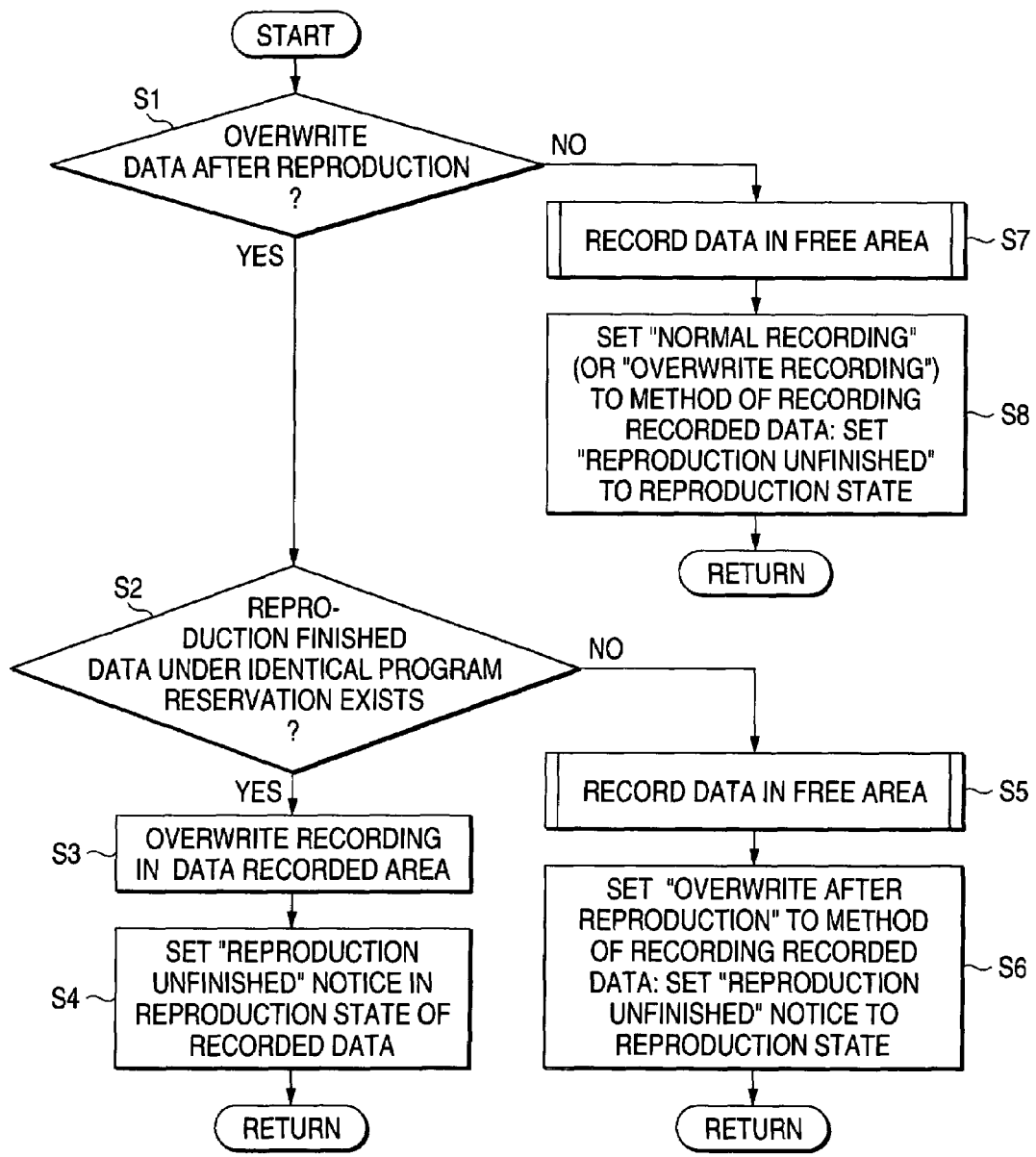
FIG. 4 is a flowchart for exemplifying serial operations when recording program data via reservation.

FIG. 4 shows a flowchart showing operations for recording program data via a reservation. The CPU 20 reads data of the date and time from the clock IC 23 across predetermined time intervals, for example, every 100 millisecond, and then, compares the read-out data of the date and time to the commencing date and time shown in the program reservation list 31. The CPU 20 actuates the program of the flowchart shown in FIG. 4 only when the date and time designated in both data coincide with each other.

When the program has been actuated, step S1 is entered, in which, upon checking the program reservation list 31, it is determined whether the recording method for recording program data has been specified to "overwrite after reproduction," or not. When it is determined to be "overwrite after reproduction," then step S2 is entered, in which it is determined whether a reproduction finished data (file) recorded via a program reservation identical to a broadcast program to be reserved henceforth is actually exists on a recording medium, or not. This judgment is drawn by checking the existence or absence of those specific broadcast program data in the program recording list 32, which are individually finished with a reproduction process and contain the identical data pertaining to the month/date, actuating time, and broadcasting channel, in the reserved broadcast programs subject to a recording process henceforth. When it is determined that the data recorded via reservation of an identical program and finished with a reproduction process exists on the hard disk drive 11, then step S3 is entered, in which a data is overwritten in the area recorded with said data. Next, step S4 is entered, in which a "reproduction unfinished" notice is set to the column for designating the reproduction state in the program recording list 32, and then the operating mode is returned to START. Note that, inasmuch as the recording method specifies to "overwrite after reproduction," it is quite reasonable that the act of overwriting any data against the area recorded with the data not yet finished with a reproduction process is subject to prohibition.

If it is determined in step S2 that any file recorded with a program data via reservation of an identical program and finished with a reproduction process dose not exist on the hard disk drive 11, then step S5 is entered, in which reserved program data is recorded in a free area of the hard disk drive 11. Detailed processes are exemplified in the chart shown in FIG. 5. While the above state exists, data to be recorded via the identical program reservation is added to the program recording list 32. Next, step S6 is entered, in which the recording mode "overwrite after reproduction" is set to the column of the recording method and "not yet reproduction" notice is set in the column of the reproduction state shown in the program recording list 32, and then, the operating mode returns to START.

If it is determined to be "NO" in the initial step S1, in other words, when the recording mode is specified as the "normal recording" or "overwrite recording," then, step S7 is entered, in which program data is recorded in a free area of the hard disk drive 11. In this case, data to be recorded via an identical program reservation is added to the program recording list 32. Next, step S8 is entered, in which, in accordance with the contents of the method of recording program data via program reservation, the "normal recording" mode or the "overwrite recording" mode is set to the column of the recording method shown in the program recording list 32, and further, the "reproduction unfinished" notice is set to the column of the reproduction state, and then, the operating mode returns to START.

Figure 5:
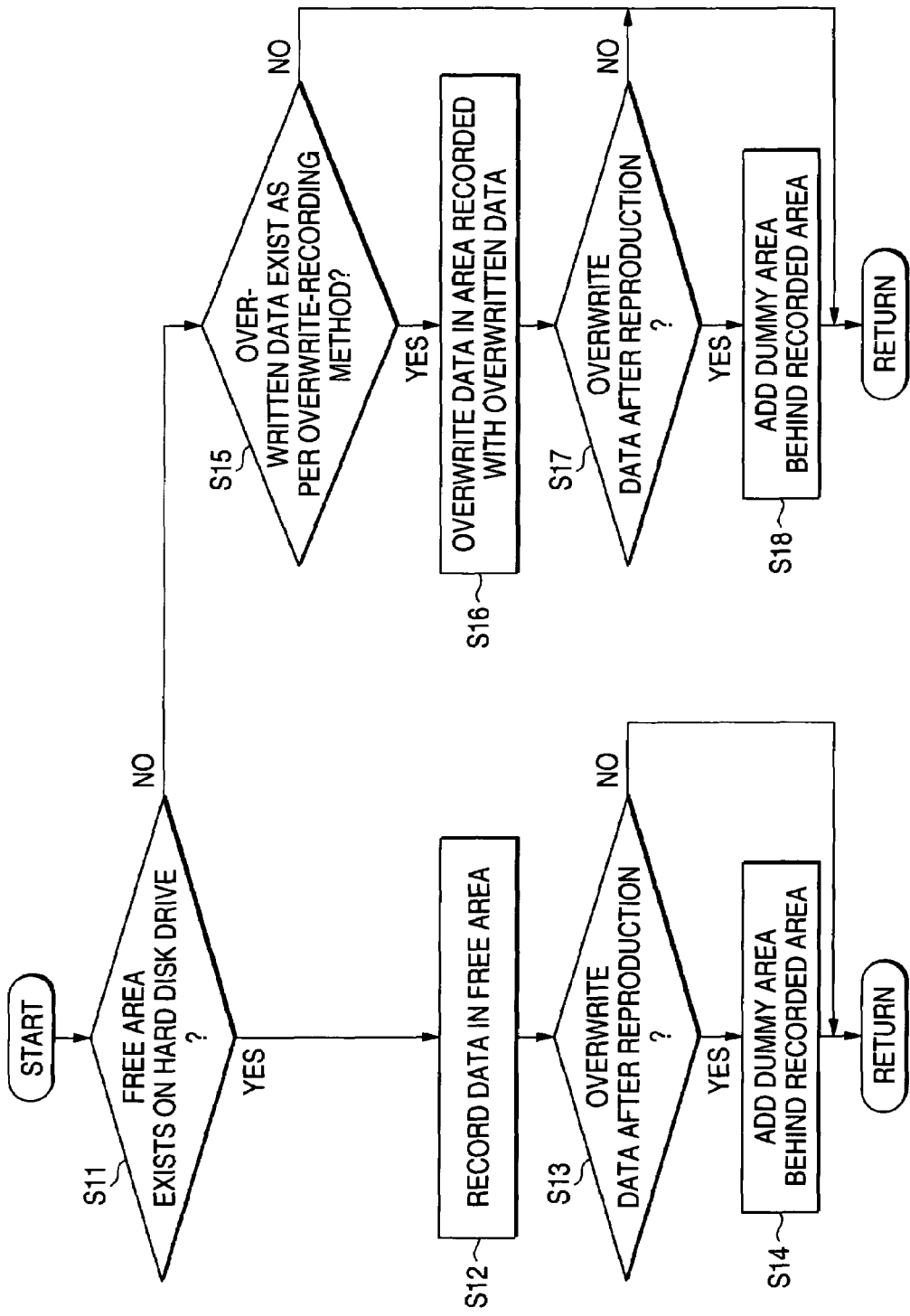
FIG. 5 is a flowchart for exemplifying serial operations when recording program data in a free area of a recording medium.

FIG. 5 shows a flowchart showing operations to be performed when recording program data into a free area. Initially, step S11 is entered, in which it is determined whether there is a free area, or not. If any free area is available on the hard disk drive 11, then, step S12 is entered, in which program data is recorded in the available free area. Next, step S13 is entered, in which it is determined whether the method of recording the program data via the program reservation corresponds to the "overwrite after reproduction," or not. If it is determined not, the operating mode returns to START without executing any process. Conversely, if the recording method conforms to the "overwrite after reproduction," then, step S14 is entered, in which a dummy area is added to the backside of the area recorded with program data so as to constitute an area fully available for recording the program data (file). That is, the recording area for the relevant data has a larger size than the size of actually recorded data. For example, in the case of recording a broadcast program with a 30 minutes duration, if the dimension of the broadcast video image differs from each other, then, the data size is also different from each other. By setting up the above arrangement, when step S3 shown in FIG. 4 is underway, it is possible to securely overwrite new data in the area recorded with a reproduction finished data. It is so designed that the overall area available for the recording is arranged to be approximately 1.1 to 1.5 times the size of the actually recorded data. After completing the process corresponding to step S14, the operating mode returns to START.

If it is determined in step S11 that no free area is available, then, step S15 is entered, in which, by checking the program recording list 32, it is determined whether the hard disk drive 11 contains such program data (file) recorded via the method of recording data based on the "overwrite recording," or not. In the case where the hard disk drive 11 is devoid of the data recorded based on the "overwrite recording," the operating mode returns to START without executing any process. Conversely, if the hard disk drive 11 contains the data recorded based on the overwriting, then, step S16 is entered, in which data is overwritten in the area recorded with the above data being recorded based on the "overwrite recording."

Next, step S17 and step S18 are serially entered, in which, as was performed in steps S13 and S14, if the method of recording the program data via reservation corresponds to the "overwrite after reproduction," a dummy area is added to the backside of the recorded area so as to constitute the whole area to be available for recording the program data (file), and then, the operating mode returns to START.

While the above step S15 is underway, inasmuch as the data based on the method of recording specified so as to "overwrite after reproduction" is excluded from the object of judgment, even when this data is finished with a reproduction process, there is no fear of causing any data derived from another program recording reservation to be overwritten in the area recorded with the above data. In other words, the above reproduction finished data derived from the recording method specified so as to "overwrite after reproduction" can be secured as the area for enabling the forthcoming data pertaining to an identical program reservation to be implemented for the data recording.

When overwriting new data in the area recorded with such data (file) based on the recording method specified so as to "overwrite recording," by checking whether this data is finished with a reproduction process or not and also checking the time-wise sequence of the recorded date and time, it is desired that new data shall preferentially be overwritten in the area recorded with this data being subject to least obstruction from the act of overwriting. If it is determined in step S15 to be "NO," it is necessary to effect any process to handle this. However, this is not a matter directly affecting the effect of the present invention, further description thereof is omitted.

Figure 6:
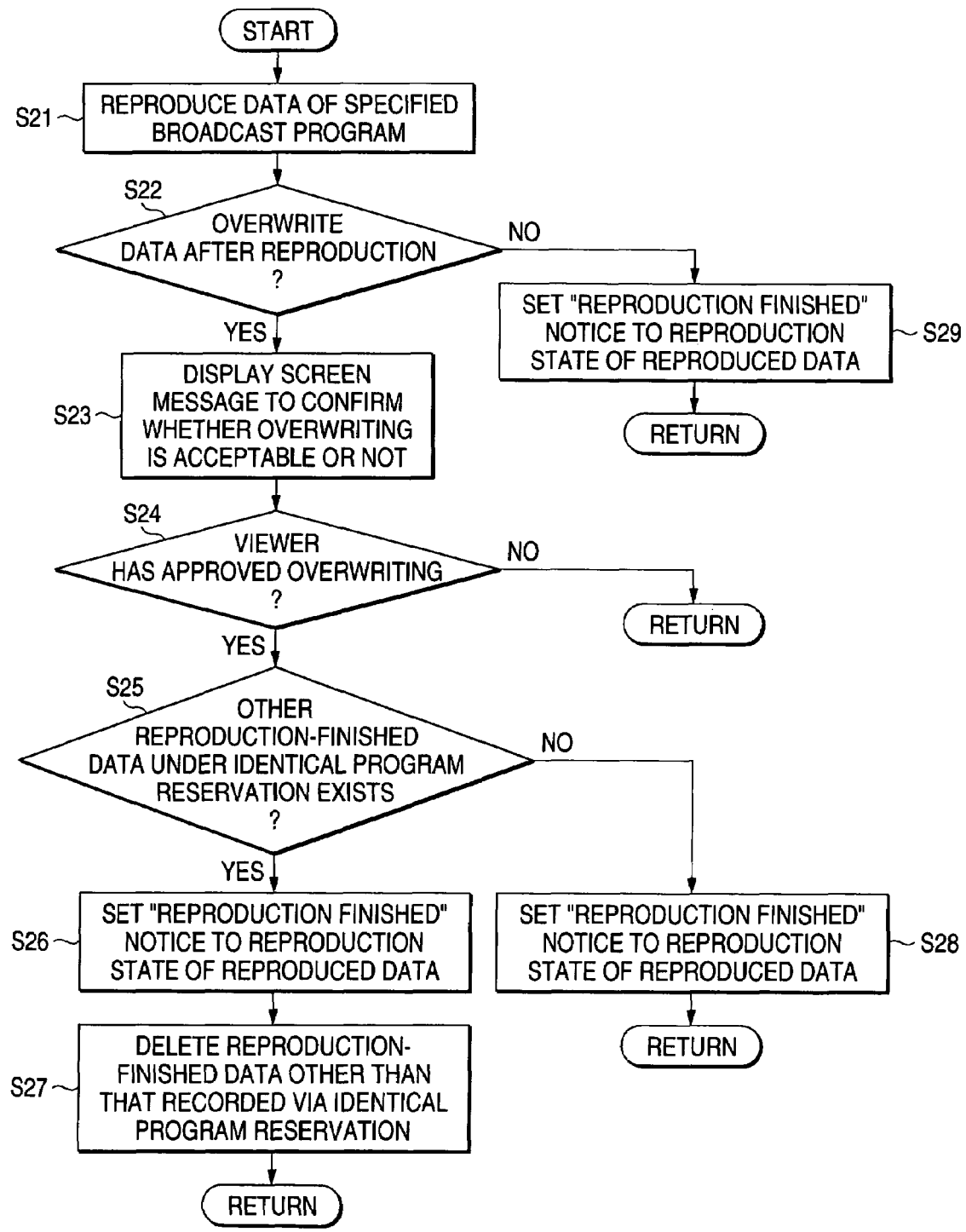
FIG. 6 is a flowchart for exemplifying serial operations when reproducing recorded program data.

FIG. 6 shows a flowchart for designating serial operations performed in the course of reproducing the recorded program data. The program is actuated when reproduction is instructed after specifying a broadcast program from the program recording list 32. Initially, step S21 is entered, in which data (file) of the specified broadcast program is reproduced. After completing reproduction of this program data, step S22 is entered, in which it is determined whether the method of recording the data reproduced via the step S21 corresponds to the "overwrite after reproduction," or not. If it is determined to be so, then, step S23 is entered, in which a screen message 33, as shown in FIG. 7, for confirming approval for or disapproval against the act of overwriting is shown on the video display unit 2 functioning as the OSD. When the viewer depresses the decision key after choosing either "YES" or "NO" by the cursor key on the screen message 33, then, step S24 is entered, in which the CPU 20 determines whether the viewer has approved of the overwriting of new data or disapproved of the overwriting thereof.

The reason why the video recording apparatus seeks the instructions of the viewer is explained below. For example, assume that there are a plurality of viewers for viewing recorded broadcast programs via reservation in a household. Even if one of them may have viewed the recorded program, there may be a case in which the act of overwriting data may have to be prohibited so that the rest of them may securely be able to view the corresponding broadcast program. If the viewer disapproves of the act of overwriting new data, the operating mode will return to START without executing any process. Accordingly, in this case, although the broadcast program data has been reproduced, the column of the program recording list 32 for designating the reproduction state remains in the "reproduction unfinished" condition.

If the viewer approves of the act of overwriting, it is determined in step S25 whether any data finished with a reproduction process other than the one under an identical program reservation is present on the hard disk drive 11, or not. If the presence of this data is determined, then step S26 is entered, in which a "reproduction finished" notice is set to the reproduction state of the data reproduced via the preceding step S21, and then deletes the other reproduction finished data under the identical program reservation from the hard disk drive 11, and then, the operating mode returns to START. As a result of implementing the above arrangement, the unit number of the reproduction finished data conforming to its recording method specifying to "overwrite after reproduction" will become 1 on the hard disk drive 11. Accordingly, as long as the data reproduction is properly carried out, there is no fear of causing the unit number of the data derived from its recording method specified so as to "overwrite after reproduction" for periodically recording program data via a reservation to be increased significantly, thereby preventing the free area of the hard disk drive 11 from being decreased. In place of applying steps S26 and S27, it is also allowable to delete the data reproduced via the preceding step S21. In this case, inasmuch as those data recorded in the earlier time and earlier dates will remain in the program recording list 32, the viewer may feel somewhat awkward. Anyway, it is suggested that either the reproduced data or the other data finished with a reproduction process shall be deleted.

If it is determined in step S25 that any other data other than the one reserved via an identical program is not present on the hard disk drive 11, then, step S28 is entered, in which the "reproduction finished" notice is set to the reproduction state of the reproduced data. By adapting this method, inasmuch as a new data reserved under the identical program reservation is overwritten for recording in the data recording area while step S3 is underway, it is possible to prevent the free area of the hard disk drive 11 from being decreased.

If it is determined to be "NO" in step S22, in other words, when the recording method is defined to implement the "normal recording" or the "overwrite," then step S29 is entered, in which the "reproduction finished" notice is set to the reproduction state of the corresponding data shown in the program recording list 32, and then, the operating mode returns to START.

In the above embodiment of the present invention, if it is determined to be "NO" in step S24 that the viewer disapproved of the overwriting, although the objective data was reproduced, the reproduction state still remains in the "reproduction unfinished" condition in the program recording list 32, and thus, it is likely that the viewer will feel somewhat awkward about this condition. To handle this problem, if it is determined to be "NO" in step S24 that the viewer disapproved of the overwriting, it is also allowable to set a notice for specifying "reproduction finished, but overwriting prohibited" in the reproduction state and then cause the operating mode return to START. In this case, while step S2 shown in FIG. 4 is underway, if the reproduction state of the corresponding data is defined as "reproduction process has been finished, but the overwriting is prohibited," this data is not treated as data finished with a reproduction process. When the video recording apparatus 1 is operated by a single viewer, after completing a reproduction process, inasmuch as no obstruction will be generated by the act of overwriting a new data, it is allowable to newly arrange a mode for determining whether the processes subject to steps S2 and S24 should be executed, or not.

Further, for example, when only part of the predetermined data has been reproduced, in other words, when a reproduction process has been discontinued, it is also possible to have the operating system execute those steps corresponding to S23 and S24. Further, when all the predetermined data have been reproduced, all the corresponding data may be treated as data finished with the reproduction process. On the other hand, when only part of the predetermined data have been reproduced, the corresponding data may be treated as data "reproduction unfinished."

Next, another practical embodiment of the present invention is described below by referring to a case in which multiple viewers jointly view identical broadcast programs recorded via an identical reservation. In this embodiment, a novel function for setting the number of reproducible times in the course of reserving a program recording is additionally provided. In the column for designating the recording method shown in the program reservation list 31, in place of the terms specifying "overwrite after reproduction," the column is displayed with the new terms "overwrite after reproduction (4 times)" designating 4 the number of reproducible times, for example, and it is also possible to vary the number of the reproducible times per individual broadcast program. It should be noted that the video recording apparatus 1 according to the preceding embodiment is capable of reproducing program data for only one time. As in the case of those data for designating the recording method and the reproduction state based on the programmed recording, data of the program reproducible times is recorded in the area available for controlling individual data (files).

Referring to the flowchart shown in FIG. 8, sequence of the data reproducing operations according to the second embodiment of the present invention is described below. It should be noted that operations for recording a reserved program are identical to the one shown in FIG. 4. Steps S23 and S24 shown in the flowchart of FIG. 6 have been replaced with steps S33, S34A and S34B shown in the flowchart of FIG. 8, and thus, only those operations related to steps S33, S34A, and S34B, shown in the flowchart of FIG. 8, are described below. Initially, step S33 is entered, in which it is determined whether the actual number of the reproducible times has already been decreased to 0, or not. If the actual number of the reproducible times has been decreased to 0, then, the operating mode returns to START without executing any process. If the actual number were other than 0, then step S34A is entered, in which a value 1 is subtracted from the number of the reproducible times. Next, step S34B is entered, in which it is determined from the result of the subtraction that the number of the reproducible times has become 0, or not. If the result is other than 0, the operating returns to START without executing any process. Accordingly, the reproduction state of the reproduced data remains as of the "reproduction unfinished" condition. On the other hand, if the result is 0, as was performed in the flowchart shown in FIG. 6, serial step-wise operations step S35 and the following are executed, and then, the "reproduction finished" notice is set to the reproduction state of the corresponding data.

As described above, the reproduction state of the corresponding data remains in the "reproduction unfinished (unreproduced)" condition until the program data reproduction processes have been executed by the predetermined number of the reproducible times. Accordingly, even when deleting a confirming operation in opposition of the viewer as shown in steps S23 and S24 of FIG. 6, it is possible to prevent any data from being overwritten against the area previously recorded with the above program data, thereby enabling multiple viewers to securely view the recorded program data. When a broadcast program whose reproducible times predetermined to be 4 times has been reproduced for only one time, the column for displaying the reproduction state of the program recording list 32 displays a screen message informing "reproduction unfinished (remains for 3 times)," for example.

The above description has referred to a specific embodiment of the function and operation of the video recording apparatus 1 mounted with a hard disk drive 11 and a removable disc 12 according to the present invention, in particular, by referring to the case of enabling a broadcast program reserved as per the recording method specifying to "overwrite after reproduction" to be recorded onto the hard disk drive 11. Further, if the removable disc 12 includes a read-write enable and randomly accessible recording medium such as a DVD-RAM, for example, the above-described inventive art is also applicable thereto. Available recording medium not only comprises a hard disk drive 11 or a DVD-RAM, but any recording medium capable of exerting an equivalent function may also be used. Further, the above-cited video recording apparatus related to the present invention may also comprise a television receiving unit integrated with an AV data receiving and reproducing apparatus.

The above description has solely referred to the practical example of recording AV data received via broadcast TV programs. However, it is also possible to apply the above-described invention to the case of recording the periodically broadcast radio programs or the case of recording various programs other than those periodically transmitted by television and radio programs as well.

As described above, the video recording apparatus according to the invention includes; a program reserving unit for reserving recording of a broadcast program; a recording and reproducing unit, which enables a periodically broadcast program reserved via the program reserving unit to be recorded on a recording medium and enables the periodically broadcast program recorded on the recording medium to be reproduced; a first control unit for controlling the recording operation of the recording and reproducing unit; and a second control unit for controlling reproducing operation of the recording and reproducing unit.

When causing a reserved periodic broadcast program conforming to the recording method specified by the program reserving unit to "overwrite after reproduction" to be recorded on a recording medium, in the case where a reproduction finished recorded data recorded earlier than the corresponding periodic broadcast program still exists on the recording medium, the first control unit causes the recording unit to record the data of the present periodic broadcast program in the area recorded with the above data via an overwriting process, and then sets a "reproduction unfinished" mode in the area for controlling the recorded data. When the recorded data finished with a reproduction process dose not exist, the first control unit causes the recording unit to record data of the present periodic broadcast program in a free area of the recording medium, and then sets the recording method to specify "overwrite after reproduction" in the area provided for controlling the recorded data, and further generates a "reproduction unfinished" notice for designating the reproduction state.

Further, when reproducing data recorded from a periodic broadcast program specified so as to "overwrite after reproduction" in an area controlled by the second control unit, in response, the second control unit displays a screen message for confirming whether an act of overwriting any data against the recorded data is approvable or not. If the viewer approves the overwriting, and further, in the case where a reproduction finished data corresponding to another data recorded from a periodic broadcast program identical to the above recorded data finished with a reproduction process still exists on the recording medium, the second control unit deletes the reproduction finished recorded data or the other recorded data from the recording medium. When deleting the other recorded data, a "reproduction finished" notice is generated so as to designate the reproduction state of the recorded data finished with a reproduction process. When the viewer approves the act of overwriting, and further, when other recorded data finished with a reproduction process does not exist, the second control unit generates a "reproduction finished" notice for designating the reproduction state of the recorded data finished with a reproduction process.

Further, the first control unit prohibits such a process for recording any data other than the corresponding periodic broadcast program via an overwriting process in an area recorded with data of a periodic broadcast program based on the recording method specified so as to "overwrite after reproduction" and the reproduction state defined as the "reproduction finished" in the area controlled by the first control unit.

Note that a central processing unit (CPU) solely executing a program for controlling the recording operation and another program for controlling the reproducing operation performed by the video recording apparatus corresponds with the first and second control unit.

According to the above arrangement, in regard to a reserved periodic broadcast program based on the recording method specified so as to "overwrite after reproduction," it is not likely that the unit number of the recorded data finished with a reproduction process recorded by a program reservation will exceed one unit. As a result, it is possible to prevent a free area of a recording medium from being decreased, and further, a viewer is enabled to easily locate any program desired for reproduction from a list of recorded programs. Further, inasmuch as the second control unit automatically deletes any of those recorded data finished with a reproduction process other than a remaining reproduction-finished recorded data, those processes otherwise required for individually deleting the unwanted recorded data finished with a reproduction process can be eliminated. Further, inasmuch as it is possible to specify the recording method so as to "overwrite after reproduction" when reserving any program, even when failing to specify the recording method so as to "overwrite after reproduction" per individual data recorded from the periodic broadcast program, it is possible to prevent any data from being overwritten against the recorded data until the recorded data is eventually reproduced. Accordingly, viewers will be able to avoid the fear of missing the recorded data. Further, inasmuch as an act of overwriting any data other than new data from an identical reserved program against a unit of remaining recorded data finished with a reproduction process is prohibited, even when the free area disappears from the recording medium, it is possible to record new data of an identical reserved program in the area recorded with a unit of remaining recorded data finished with a reproduction process. Further, inasmuch as it is so arranged that, after reproducing the recorded data, a screen message is displayed for confirming with the viewer whether the act of overwriting any data against the recorded data is approvable or not, and further, unless the viewer approves the act of overwriting data, the recorded data is not treated as data complete with the reproduction, and thus, the recorded data is not subject to deletion until the viewer approves this effect. Due to the above reason, even when a plurality of viewers are present, each viewer is enabled to avoid the fear of missing the recorded data.

According to another aspect of the present invention, there is provided a recording and reproducing method by way of applying the video recording apparatus including a program reserving unit for reserving recording of a broadcast program and a recording and reproducing unit available for recording a periodically broadcast periodic broadcast program reserved by the program reserving unit on a recording medium as well as reproducing the periodic broadcast program recorded in the recording medium, wherein the recording and reproducing method includes steps of: causing the program reserving unit to set the method of recording a periodic broadcast program so as to "overwrite after reproduction;" determining whether specific data recorded earlier than the presently available periodic broadcast program finished with a reproduction process in the reproduction state still exists on a recording medium or not when causing the recording and reproducing unit to record a reserved periodic broadcast program as per the recording method specifying so as to "overwrite after reproduction" in the recording medium; setting a "reproduction unfinished" area in a data controlling area in the case where a reproduction finished recorded data still exists, new data from the present periodic broadcast program is recorded via an overwriting process in the area recorded with the reproduction finished recorded data before setting the above-referred "reproduction unfinished" area; setting an "overwrite after reproduction" format as the recording method and a "reproduction unfinished" notice for designating the reproduction state in the controlling area of the data recorded from the presently available periodic broadcast program after recording the data of this broadcast program on a recording medium in the case where the reproduction finished recorded data dose not exist therein; determining whether other recorded data recorded from a periodic broadcast program identical to the recorded data finished with a reproduction process still exists on a recording medium or not in the case in which the recording and reproducing unit reproduces data recorded from a reserved periodic broadcast program pertaining to a reserved program to be recorded in the data controlled area so as to "overwrite after reproduction, and then, after reproducing the recorded data, a screen message is displayed for confirming with the viewer whether the act of overwriting any data against the recorded data is approvable or not. If the viewer approves the act of overwriting any data, the above-described determining process is executed; setting a "reproduction finished" notice so as to designate the actual reproduction state of the reproduction finished recorded data in the case in which existence of other recorded data finished with a reproduction process has been determined, then, in response to the above notice, the recorded data finished with a reproduction process or the other recorded data is deleted from the recording medium; wherein, even when the other data has been deleted, the above "reproduction finished" notice is also generated; generating a "reproduction finished" notice for designating the actual reproduction state of the recorded data finished with a reproduction process when absence of the other data finished with a process of reproducing data from the recording medium has been determined; and prohibiting recording of any data of any program other than the corresponding periodic broadcast program in the area recorded with the data of a periodic broadcast program pertaining to the reserved program specifying so as to "overwrite after reproduction" in the controlling area and further notifying of the actual "reproduction finished" state.

By implementing the above processes, it is possible to generate as satisfactory an effect as that which was achieved by the preceding invention.

The video recording apparatus according to the present invention includes a recording and reproducing unit for recording and reproducing data onto and from a recording medium, a program reserving unit for reserving recording of a program, and a control unit for controlling the function of the recording and reproducing unit. When causing the recording and reproducing unit to record a reserved program subject to the recording method specified by the program reserving unit so as to "overwrite after reproduction" on a recording medium, the control unit causes the recording unit to record data of the corresponding periodic broadcast program in a free area or a specific area (free from the prohibition of the overwriting process) present on the recording medium. When causing the recording and reproducing unit to reproduce data recorded from a periodic broadcast program pertaining to the reserved program based on the recording method specifying so as to "overwrite after reproduction," the control unit deletes the reproduction finished recorded data from the recording medium so that the unit number of the reproduction finished recorded data related to the periodic broadcast program will become less than a predetermined unit number. The above-referred area free from prohibition of overwriting includes an area recorded with the reproduction finished data other than the identical reserved program. The above-cited predetermined unit number includes 0.

According to the above configuration, in terms of a periodic broadcast program based on a reserved program specifying its recording method so as to "overwrite after reproduction," the number of the reproduction finished recorded data recorded via a reserved program becomes less than a predetermined unit number. Due to this reason, it is possible to prevent the free area of a recording medium from being decreased, and further, enables a viewer to easily locate a reproduction desired program from a program recorded list. Further, inasmuch as those reproduction finished recorded data other than those reproduction finished recorded data below a predetermined unit number still remain in the recording medium are automatically deleted by the control unit, a variety of processes otherwise required for individually deleting unwanted recorded data finished with a reproduction process can be eliminated. Further, it is possible to predetermine the recording method so as to "overwrite after reproduction" in the course of reserving a program, and thus, even when deleting the "overwrite after reproduction" format per data to be recorded via a periodic program, it is possible to prevent any data from being overwritten until the recorded data is reproduced. Because of this, a viewer can avoid the fear of missing the recorded data. Note that, when the predetermined unit number corresponds to zero, the reproduction finished recorded data no longer exists.

In the course of decreasing the reproduction finished recorded data recorded from a periodic program pertaining to a reserved program as per the recording method specifying so as to "overwrite after reproduction" to be less than a predetermined unit number, the control unit determines whether other recorded data from a reserved program identical to the reproduction finished recorded data finished with a reproduction process actually exists on a recording medium, or not. If it is determined that the above-cited other recorded data actually exists on the recording medium, the control unit deletes either the reproduction finished recorded data or the above-cited other data from the recording medium. By implementing the above processes, there is no likelihood of causing the unit number of the reproduction finished recorded data pertaining to an identical reserved program of becoming greater than 1, thereby more securely preventing the free area from being decreased in the recording medium.

The program reserving unit is enabled to preset the reproducible times in the case of reproducing the data recorded from a periodic program periodically recorded onto a recording medium. When the data recorded from a periodic program pertaining to a reserved program by specifying its recording method so as to "overwrite after reproduction" has been reproduced by the number of reproducible times, the control unit treats the recorded data as data finished with the reproduction processes. Based on the above arrangement, it is possible to prevent the recorded data from being overwritten until being reproduced by the number of reproducible times. Even when a plurality of viewers are present, each viewer will be able to avoid the fear of missing the recorded data. Further, in the presence of a plurality of viewers, it is no longer necessary to make a confirmation with the viewers each time the recorded data is reproduced, whether they can agree that the recorded data shall be treated as data finished with the reproduction processes, thus promoting operationality.

In the course of reproducing data recorded from a periodic program pertaining to a reserved program as per its recording method specifying so as to "overwrite after reproduction," the control unit determines the instructions of the viewer, and then, in conformity with the viewer's instructions, handles the above recorded data as data finished with the reproduction processes or not data finished with the reproduction processes. Due to this arrangement, unless the viewer approves, even the reproduction finished recorded data is not treated as data finished with the reproduction processes, thus making it possible to prevent the recorded data from being overwritten, and further, making it possible to repeatedly carry out the reproduction as long as the viewer approves this effect. Due to this arrangement, even when a plurality of viewers are present, each viewer will be able to avoid the fear of missing the recorded data.

After reproducing all the data recorded from a periodic broadcast program pertaining to a reserved program as per its recording method specifying so as to "overwrite after reproduction," the control unit handles the corresponding recorded data as data finished with the reproduction processes, whereas when only part of the recorded data has been reproduced, the control unit does not handle them as data finished with the reproduction processes. Due to the above arrangement, for example, in the case where the reproduction process was discontinued, the control unit does not handle the recorded data as data finished with the reproduction processes, and thus, the recorded data will be prevented from being overwritten, thereby enabling data to be reproduced over again.

The control unit prohibits an act of overwriting any data other than new data corresponding to an identical reserved program in the area accommodating the reproduction finished data recorded from a periodic program pertaining to a reserved program as per its recording method specifying so as to "overwrite after reproduction." According to this arrangement, there is no fear of causing data of another program to be overwritten against the reproduction finished data recorded from the reserved periodic program, thereby making it possible to secure the above recorded area so as to enable new data of an identical reserved program to be recorded therein.

In the course of enabling data from a periodic broadcast program pertaining to a reserved program as per its recording method specifying so as to "overwrite after reproduction" to be recorded on a recording medium, the control unit secures a recording area having its own size larger than the size of the data recorded from the above periodic program as an area available for recording the data of the periodic program. According to this arrangement, even when actual sizes of a plurality of data generated by an identical reserved program differ from each other, it is possible to securely overwrite new data generated from the identical reserved program onto the area recorded with the reproduction finished recorded data. Even when the recording medium is totally devoid of a free area, it is still practicable to record the data of the above periodic broadcast program.

The present invention further provides a video recording apparatus including; a recording and reproducing unit, which records and reproduces program data onto and from a recording medium; a recording instruction unit for instructing the recording unit to record the program data; and a control unit for controlling the function of the recording and reproducing unit as well as the recording instruction unit. The recording instruction unit can set the method of recording the program data on a recording medium as per the "overwrite a data after completing a reproduction process" format, and further, it can also set the number of reproducible times of the data conforming to the recording method specifying so as to "overwrite after reproduction". After enabling data of a recorded program specified by the recording method so as to "overwrite after reproduction" to be reproduced by the number of reproducible times, the control unit handles the recorded data as data finished with the reproduction processes. If the corresponding recorded data is not finished with a reproduction process, then the control unit prohibits an act of overwriting any data against the above recorded data. Conversely, if the corresponding recorded data is finished with a reproduction process, the control unit approves the act of overwriting any data against the above recorded data. By virtue of the above arrangement, the act of overwriting any data against the above recorded data is prevented from overwriting until the corresponding recorded data have been reproduced by the number of the reproducible times. Even when a plurality of viewers are present, each viewer is enabled to avoid the fear of missing the recorded data. Further, even in presence of a plurality of viewers, it is no longer necessary to confirm with each viewer each time reproducing the recorded data, whether they can accept that the recorded data shall be treated as data finished with the reproduction process, or not. This arrangement promotes operationality. Note that the above-referred recording instruction unit may be one that instructs to commence a recording operation in response to the reserved program or one that instructs to commence an operation for recording data of a program currently on the air.

According to the present invention, it becomes possible to prevent the free area of a recording medium loaded in a video recording apparatus from being decreased without complex operations, and further, it is also possible to allow viewers to avoid the fear of missing data recorded on a recording medium.

Although the present invention has been shown and described with reference to a specific preferred embodiment, various changes and modifications will be apparent to those skilled in the art from the teachings herein. Such changes and modifications as are obvious are deemed to come within the spirit, scope and contemplation of the invention as defined in the appended claims.

What is claimed is:

1. A recording and reproducing apparatus comprising:
a program reserving unit for reserving recording of a broadcast program;
a recording and reproducing unit, which enables a periodically broadcast periodic broadcast program reserved via said program reserving unit to be recorded on a recording medium so as to enable said periodic broadcast program recorded on said recording medium to be reproduced;
a first control unit, which controls recording operation of said recording and reproducing unit; and
a second control unit, which controls reproducing operation of said recording and reproducing unit;
wherein when causing said program reserving unit to set a recording method so as to overwrite after reproduction in the course of recording a reserved periodic broadcast program onto a recording medium, in the case where data previously recorded earlier than said periodic broadcast program finished with a reproduction process still remains in said recording medium, said first control unit causes data of the presently available periodic broadcast program to be recorded via overwriting onto an area previously recorded with said data, and then, said first control unit sets a reproduction unfinished domain in the controlling area of said recorded data so as to designate the actual reproduction state; whereas in the case where said recorded data finished with a reproduction process does not exist on said recording medium, said first control unit enables data of the presently available periodic broadcast program to be recorded in a vacant area of said recording medium, and then, sets an overwrite after reproduction mode as per said recording method and further sets a reproduction unfinished mode so as to designate the actual reproduction state in the controlling area of said recorded data,
wherein when reproducing data recorded from a periodic broadcast program so as to overwrite after reproduction in the controlling area, said second control unit displays a screen message for confirming whether an act of overwriting against said recorded data is approvable or not, and simultaneously, when a viewer approves the act of overwriting, in the case where recorded data other than the corresponding periodic broadcast program identical to the recorded data finished with a reproduction process still exists on a recording medium, said second control unit deletes either the reproduction finished recorded data or said other recorded data from said recording medium
wherein when said other data has been deleted, a reproduction finished mode is set so as to designate the reproduction state of the above reproduction finished recorded data; wherein, if the viewer approves the act of overwriting, if the above-referred other recorded data finished with a reproduction process dose not exist on said recording medium, said second control unit sets a reproduction finished notice so as to designate the actual reproduction state of the reproduction finished recorded data,
wherein said first control unit prohibits any operation that may cause data of any program other than the data of said periodic broadcast program to be recorded via an overwriting against a data recorded area accommodating data of said previously recorded periodic broadcast program in the state specified by its recording method to overwrite after reproduction in the controlling area and further in the state in which the actual reproduction state of said periodic broadcast program has been designated as the reproduction finished state.

2. A recording and reproducing method available for a recording and reproducing apparatus including a program reserving unit for reserving the recording of a broadcast program and a recording and reproducing unit for recording a periodically broadcast program reserved by said program reserving unit on a recording medium and also for reproducing said periodic broadcast program recorded on said recording medium, said recording and reproducing method comprising;
causing said program reserving unit to set said program recording method by specifying so as to overwrite after reproduction;
determining whether data recorded earlier than the presently available periodic broadcast program for designating an actual reproduction state of said data which has already finished a reproduction process still exists on said recording medium or not at the time of causing said recording and reproducing unit to record said periodic broadcast program complete with setting of its recording method specifying so as to overwrite after reproduction onto said recording medium;
setting a reproduction unfinished notice for designating the reproduction state in a controlling area for controlling data of the presently available periodic broadcast program recorded via an overwriting process in an area provided for recording said data in the case where said recorded data finished with a reproduction process still exists on said recording medium;
setting an overwrite after reproduction format as a method for recording data of the presently available periodic broadcast program in a vacant area of said recording medium; wherein said "overwrite after reproduction" format is set within the controlling area of said recorded data, and a reproduction unfinished notice is set so as to designate the reproduction state in the case where the recorded data finished with a reproduction process does not exist on said recording medium;
determining whether recorded data finished with a reproduction process for designating the reproduction state exists in said recording medium or not, wherein when causing said recording and reproducing unit to reproduce recorded data of a periodic broadcast program pertaining to the reservation of said program as per its recording method specified so as to overwrite data after a reproduction, wherein after reproducing said recorded data, a screen message is displayed so as to confirm whether overwriting against said recorded data is approvable or not, and then, if the viewer approves an act of overwriting, other recorded data of a periodic broadcast program identical to said recorded data finished with a reproduction process is discerned whether or not said recorded data finished with a reproduction process in the manner of designating its reproduction state still exists on said recording medium;

setting a reproduction finished notice so as to designate the reproduction state of recorded data finished with a reproduction Process; wherein, if it is determined that the above-referred other data still exists on said recording medium, either said reproduction finished recorded data or said other recorded data is deleted from said recording medium, whereas when said other data has been deleted, the reproduction finished notice is generated;

setting a reproduction finished notice for designating the reproduction state of said recorded data finished with a reproduction process when absence of said other data from said recording medium has been determined; and prohibiting to record any data corresponding to any program other than the corresponding periodic broadcast program in a specific area predetermined for the recording of data of a predetermined periodic broadcast program pertaining to the reserved program entered via the recording method specifying so as to overwrite after reproduction in the controlling area and a notice for notifying of a reproduction finished mode to be set.

3. A recording and reproducing apparatus comprising:

a recording and reproducing unit for recording and reproducing a program onto and from a recording medium;

a program reserving unit for reserving recording of a program; and a control unit for controlling a function of said recording and reproducing unit, wherein when causing said recording and reproducing unit to record a reserved periodic broadcast program onto said recording medium as per the instructions of said program reserving unit to implement its recording method so as to overwrite after reproduction, said control unit records data of said periodic broadcast program in a vacant area of said recording medium or in a recording area (of said recording medium) free from prohibition of overwriting; wherein, when causing said recording and reproducing unit to reproduce recorded data of said periodic broadcast program pertaining to said program reservation as per its recording method specifying so as to overwrite after reproduction, said control unit deletes said recorded data finished with said reproduction process from said recording medium so that the unit number of said data recorded from said periodic broadcast program finished with a reproduction process will become less than the predetermined unit number.

4. The recording and reproducing apparatus according to claim 3, wherein when causing the unit number of said recorded data finished with a reproduction of a periodic broadcast program pertaining to the reservation of said program as per said recording method specifying so as to overwrite after reproduction to be less than the predetermined unit number, said control unit determines whether other recorded data other than the reserved program identical to the reproduction finished recorded data still exists on said recording medium or not, and then, if it is determined that said recorded other data exists on said recording medium, said control unit deletes said recorded data finished with a reproduction process or deletes said recorded other data from said recording medium.

5. The recording and reproducing apparatus according to claim 3, wherein said program reserving unit is capable of setting the number of the recorded data reproducible times for the data of a periodic broadcast program that can be recorded on a recording medium periodically, and wherein said control unit handles the reproduced recorded data as data finished with a reproduction process at the time of enabling the reproducing means to reproduce the data recorded via a periodic broadcast program pertaining to the reserved program as per the instructions of said recording method to overwrite after reproduction.

6. The recording or reproducing apparatus according to claim 3, wherein when said recording method causes said reproducing means to reproduce data recorded from a periodic broadcast program pertaining to the reserved program as per its recording method specifying so as to overwrite after reproduction, said control unit determines the instructions of a viewer, and then, in conformity with the viewer's instructions, handles said recorded data as data finished with a reproduction process or data reproduction unfinished.

7. The recording and reproducing apparatus according to claim 3, wherein when all the data recorded from a periodic broadcast program pertaining to the reserved program as per the recording method specifying so as to overwrite after reproduction has been reproduced, said control unit handles said recorded data as data finished with a reproduction process, whereas when only part of said recorded data has been reproduced, said control unit does not handle said recorded data as data finished with a reproduction process.

8. The recording and reproducing apparatus according to claim 3, wherein said control unit prohibits overwriting of any data other than new data recorded from an identical reserved program in any area provided for storing the reproduction finished recorded data recorded via the reserved program as per said recording method specifying so as to overwrite after reproduction.

9. The recording and reproducing apparatus according to claim 8, wherein when said recording method enables said recording and reproducing unit to record data of a periodic broadcast program pertaining to the reserved program as per said recording method specifying so as to overwrite after reproduction, said control unit secures a specific recording area having a size larger than that is held by the data recorded from said periodic broadcast program as the area available for recording data of the corresponding periodic program.

* * * * *